US007577254B2

(12) United States Patent
Vig et al.

(10) Patent No.: US 7,577,254 B2
(45) Date of Patent: Aug. 18, 2009

(54) DETECTOR AUTOCALIBRATION IN QKD SYSTEMS

(75) Inventors: Harry Vig, North Billerica, MA (US); Jonathan Young, Newburyport, MA (US); Paul A. Jankovich, Northborough, MA (US)

(73) Assignee: MagiQ Technologies, Inc., New York, NY (US)

( * ) Notice: Subject to any disclaimer, the term of this patent is extended or adjusted under 35 U.S.C. 154(b) by 489 days.

(21) Appl. No.: 10/578,155

(22) PCT Filed: Jan. 29, 2004

(86) PCT No.: PCT/US2004/002429

§ 371 (c)(1),
(2), (4) Date: May 4, 2006

(87) PCT Pub. No.: WO2005/057823

PCT Pub. Date: Jun. 23, 2005

(65) Prior Publication Data

US 2007/0133799 A1    Jun. 14, 2007

Related U.S. Application Data

(60) Provisional application No. 60/519,105, filed on Nov. 12, 2003.

(51) Int. Cl.
*H04L 9/00* (2006.01)
*H04L 9/08* (2006.01)

(52) U.S. Cl. .................. 380/256; 380/278; 380/283; 713/150; 713/189; 713/501; 713/502

(58) Field of Classification Search .............. None
See application file for complete search history.

(56) References Cited

U.S. PATENT DOCUMENTS 4,469,942 A    9/1984    Srivastava et al.

(Continued)

FOREIGN PATENT DOCUMENTS

WO    WO 9404889    3/1994

OTHER PUBLICATIONS

Bethune and Risk, "An Autocompensating Fiber-Optic Quantum Cryptography System Based on Polarization Splitting of Light", Mar. 2000, IEEE Journal of Quantum Electronics, vol. 36, No. 3, pp. 340-347.*

(Continued)

*Primary Examiner*—William R Korzuch
*Assistant Examiner*—Michael R Vaughan
(74) *Attorney, Agent, or Firm*—Opticus IP Law PLLC

(57) ABSTRACT

A method (300) of performing photon detector autocalibration in quantum key distribution (QKD) system (200) is disclosed. The method (300) includes a first act (302) of performing a detector gate scan to establish the optimum arrival time of a detector gate pulse (S3) that corresponds with a maximum number of photon counts ($N_{MAX}$) from a single-photon detector (216) in the QKD system (200). Once the optimal detector gate pulse arrival time is determined, then in an act (306), the detector gate scan is terminated and in an act (308) a detector gate dither process is initiated. The detector gate dither act (308) involves varying the arrival time (T) of the detector gate pulse (S3) around the optimal value of the arrival time established during the detector gate scan process. The detector gate dither provides minor adjustments to the arrival time to ensure that the detector (216) produces maximum number of photon counts ($N_{MAX}$).

19 Claims, 4 Drawing Sheets

U.S. PATENT DOCUMENTS

| | | | |
|---|---|---|---|
| 5,757,912 A * | 5/1998 | Blow | 380/256 |
| 5,850,441 A | 12/1998 | Townsend | |
| 5,953,421 A | 9/1999 | Townsend | |
| 6,104,986 A * | 8/2000 | Arevalo | 702/120 |
| 6,236,488 B1 | 5/2001 | Shimizu et al. | |
| 6,342,701 B1 * | 1/2002 | Kash | 250/458.1 |
| 6,445,478 B2 | 9/2002 | Shimizu et al. | |
| 6,462,825 B1 | 10/2002 | Wiebesick et al. | |
| 6,807,497 B2 * | 10/2004 | Kalem et al. | 702/72 |
| 7,102,121 B2 * | 9/2006 | Lagasse | 250/227.14 |
| 2003/0169880 A1 | 9/2003 | Nambu et al. | |
| 2004/0057526 A1 | 3/2004 | Debuisschert | |
| 2004/0109564 A1 | 6/2004 | Cert et al. | |
| 2006/0239460 A1 * | 10/2006 | Young | 380/256 |
| 2006/0239463 A1 * | 10/2006 | Young | 380/278 |

OTHER PUBLICATIONS

Rana, Ram, and Haus, "Quantum Noise of Actively Mode-Locked Lasers With Dispersion and Amplitude/Phase Modulation", Jan. 2004, IEEE Journal of Quantum Electronics, vol. 40, No. 1, pp. 41-56.*

Stucki et al, "Photon counting for quantum key distribution with Peltier cooled InGaAs/InP", http://arxiv.org quant-ph/0106007v1, pp. 1-18, Jun. 1, 2001.

* cited by examiner

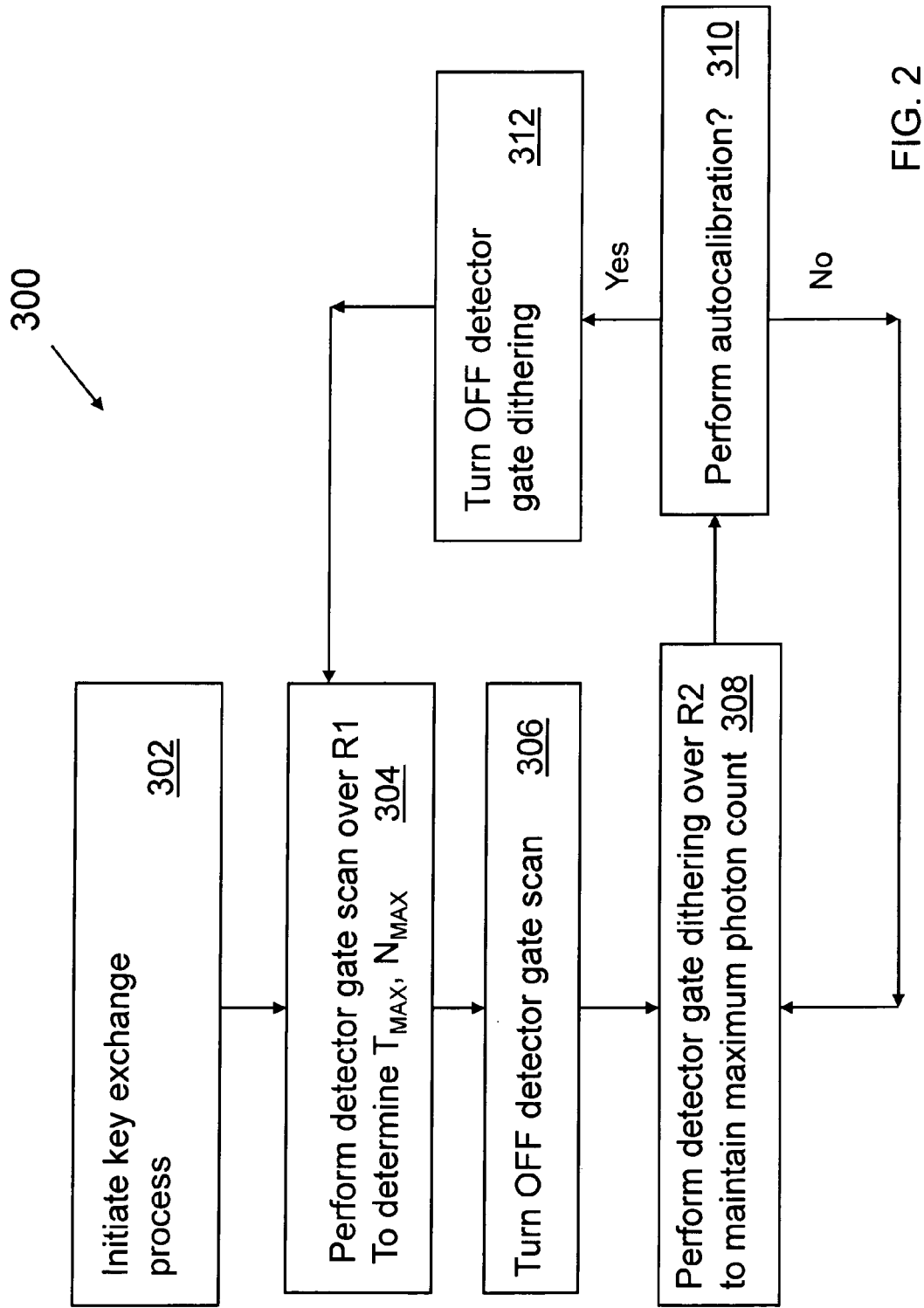

US 7,577,254 B2

DETECTOR AUTOCALIBRATION IN QKD SYSTEMS

CLAIM OF PRIORITY

This application claims the benefit of priority under 35 U.S.C. §119(e) of U.S. provisional application Ser. No. 60/519,105 filed on Nov. 12, 2003.

TECHNICAL FIELD

The present invention relates to quantum cryptography, and in particular relates to apparatus and methods of photon detector autocalibration in quantum key distribution (QKD) systems to maintain optimal system performance.

BACKGROUND INFORMATION

Quantum key distribution involves establishing a key between a sender ("Alice") and a receiver ("Bob") by using weak (e.g., 0.1 photon on average) optical signals transmitted over a "quantum channel". The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). A specific QKD system is described in U.S. Pat. No. 5,307,410 to Bennet (the '410 patent).

The above-mentioned publications each describe a so-called "one-way"QKD system wherein Alice randomly encodes the polarization or phase of single photons, and Bob randomly measures the polarization or phase of the photons. The one-way system described in the '410 patent is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

When operating a commercial QKD system, multiple variables need to be aligned in time and then maintained aligned for optimal system performance. For example, in a commercial QKD system one or more single-photon detectors are gated with a gating pulse from a controller to synchronize the detection of optical pulses with expected pulse arrival times. However, once the system is set up, the timing drifts due to various systemic and environmental factors and the photon count can drop. This leads to a reduction in the transmission rate of the system, and also to an increase in the bit-error rate—i.e., to less than optimal system performance.

While laboratory and prototype QKD systems can be adjusted to account for system drifts can under very controlled and artificial conditions, making the necessary adjustments for a commercial QKD system in the field is a far more daunting endeavor. And, unlike with a laboratory or prototype QKD system, end-users of commercial QKD systems have an expectation that their QKD system will automatically run in an optimal state with minimal or no operator intervention.

SUMMARY OF THE INVENTION

A first aspect of the invention is a method of performing autocalibration of a single-photon detector arranged to detect weak photon pulses in a quantum key distribution (QKD) system. The method includes performing a detector gate scan by sending a detector gate pulse to the single-photon detector and varying an arrival time T of the detector gate pulse over a first select range R1 to determine an optimal arrival time $T_{MAX}$ that corresponds to a maximum number of photon counts $N_{MAX}$ from the single-photon detector. The method further includes performing detector gate dithering of the detector gate pulse by varying the arrival time T over a second select range R2 surrounding $T_{MAX}$ to maintain the photon count at a maximum value.

A second aspect of the invention is method of operating a quantum key distribution (QKD) system having a single-photon detector operably coupled to a controller. The method includes sending weak photon pulses between encoding stations in the QKD system, and performing a first detector gate scan. The first detector scan is accomplished by sending a detector gate pulse from the controller to the detector over a range of detector gate pulse arrival times T to establish a first optimal arrival time $T_{MAX}$ corresponding to a first maximum number of photon counts $N_{MAX}$ from the detector. The method also includes terminating the first detector gate scan when the first $T_{MAX}$ is established, and then performing a first detector gate dither. The first detector gate dither is accomplished by the controller altering the arrival time T of the detector gate pulse over a range of arrival times R2 about the first $T_{MAX}$ to maintain either the maximum number of photon counts $N_{MAX}$ or a different maximum number of photon counts $N'_{MAX}$ over the range R2.

A third aspect of the invention is a continuation of the method of the second aspect of the invention, wherein performing the detector gate dither results in a new optimal arrival time $T'_{MAX}$. The method of the third aspect of the invention includes terminating the performing of a detector gate dither, performing a second detector gate scan, terminating the second detector gate scan, and then performing a second detector gate dither.

BRIEF DESCRIPTION OF THE DRAWINGS

FIG. 2 is a flow diagram illustrating the autocalibration of the detector through the use of scanning and dithering of the detector gate pulse to optimize the performance of the QKD system of FIG. 1;

DETAILED DESCRIPTION OF THE INVENTION

The present invention has industrial utility in connection with methods of performing autocalibration of one or more detectors in a QKD system in order to maintaining optimal system performance of the QKD system. The invention includes performing gate pulse scanning to determine the optimal detector gate pulse position (timing), as well as performing detector gate pulse timing dithering in order to maintain the optimal detector gate pulse size (i.e., width) and position during the QKD system's operation. This results in optimal optical pulse detection in the QKD system, which generally corresponds to the optimal operation of the QKD system as a whole, even if environmental conditions vary in a manner that would otherwise affect system performance.

The invention has industrial utility for one-way, two-way and ring topology or n-way QKD systems using either polarization encoding or phase encoding, and using one or more single-photon detectors. The invention is described below in connection with an example embodiment of a two-way QKD system using phase-encoding and a single detector. This choice of QKD system is merely for the sake of illustrating the methods of the present invention and is not intended as limiting.

Also, in the description below, a "gating pulse" is a pulse that activates the element to which the pulse is sent, wherein the activation of the element corresponds to the duration (width W) of the pulse. Thus, the detector gate pulse activates the detector for the duration (i.e., width) of the detector gate pulse, wherein activation starts at the leading edge of the pulse and ends at the trailing edge of the pulse.

QKD System Embodiment

Figure 1:
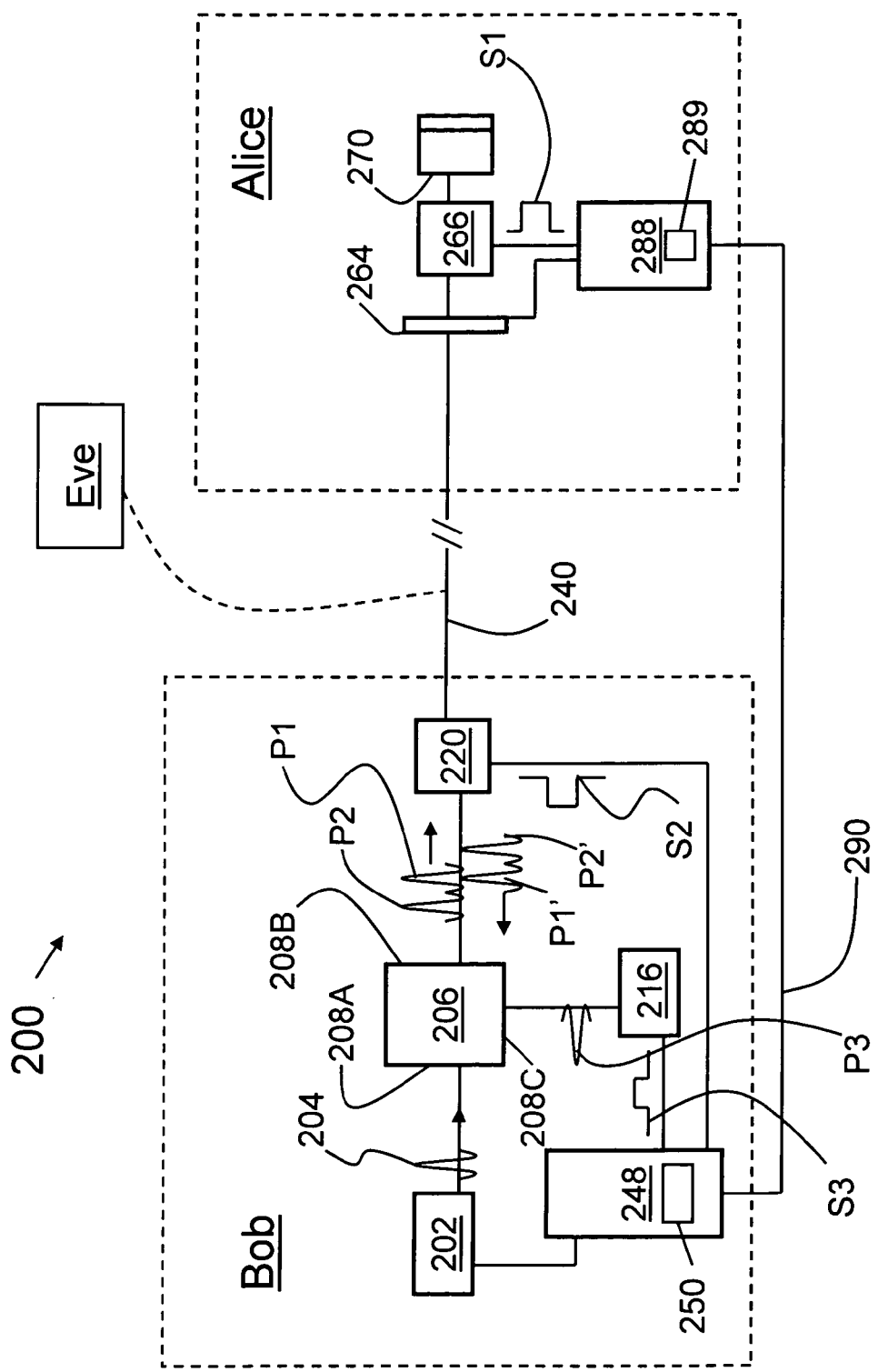
FIG. 1 is an example embodiment of a two-way QKD system.

FIG. 1 is a schematic diagram of an example embodiment of a folded QKD system 200 to which the methods of the present invention are aptly suited. System 200 includes two key encoding stations: a transmitting/receiving station Bob and a reflecting station Alice, referred to hereinafter simply as "Bob" and "Alice."

Bob

With continuing reference to FIG. 1, Bob includes a laser 202 that emits light pulses 204. Laser 202 is coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed pulses P1 and P2 and outputs them at input/output end 208B. Likewise, optical system 206 also receives optical pulses at input/output end 208B, as described below.

A single-photon detector 216 is coupled to optical system 206 at detector output end 208C. A phase modulator (PM) 220 is coupled (e.g., by an optical fiber) to optical system input/output end 208B. An optical fiber 240 connects Bob to Alice at PM 220.

Bob also includes a controller 248 operatively (e.g., electrically) coupled to laser 202, detector 216, and PM 220 to control the operation of these elements, as described below. In an example embodiment, controller 248 includes a programmable computer capable of performing instructions (e.g., "software") stored on a computer-readable medium 250. In an example embodiment, the instructions stored on the computer-readable medium 250 include methods according to the present invention as described below.

Alice

Alice includes a variable optical attenuator (VOA) 264 connected to optical fiber 240. A phase modulator (PM) 266 is arranged downstream of and is optically coupled to VOA 264. A Faraday mirror 270 is arranged downstream of and is optically coupled to PM 266.

Alice also includes a controller 288 operatively (e.g., electrically) coupled to PM 266 and VOA 264. In an example embodiment, controller 288 includes a programmable computer capable of performing instructions (e.g., "software") stored on a computer-readable medium 289. In an example embodiment, the instructions stored on the computer-readable medium 289 include methods according to the present invention as described below.

Controllers 248 and 288 are linked (e.g., electrically or optically) via link 290 to synchronize the operation of Alice and Bob. In particular, the operation of the phase modulators 220 and 266, and detector 216 are controlled and coordinated by controllers 248 and 288 relative to the launched optical pulse 204 using gating signals S2, S1 and S3, respectively, when exchanging a quantum key between Alice and Bob. Thus, in an example embodiment, controllers 248 and 288 can be considered as constituting a single controller for the QKD system.

QKD System Operation

With continuing reference to FIG. 1, in the operation of system 200, pulse 204 is divided into two separate pulses P1 and P2 by time-multiplexing/demultiplexing optical system 206. In the present example embodiment, pulses P1 and P2 are relatively weak pulses The pulses are passed out of optical system input/output end 208B to PM 220, which is gated to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM modulates one of the pulses—say, pulse P1—to form a phase-modulated pulse P1'. This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which can attenuate the pulses if necessary. The pulses then pass back to Bob and to PM 220 therein. PM 220 is then directed to randomly modulate the remaining unmodulated pulse—in this case, pulse P2—with one of the select phase modulation values. This is achieved by controller 248 providing a well-time gating signal S2 to PM 220 that activates the phase modulator during the short time period within which pulse P2 passes through PM 220.

Now-modulated pulses P1' and P2' (the latter is not shown in FIG. 1) continue on to optical system 206. Optical system 206 combines the pulses to form a combined pulse P3, which is directed out of detector output end 208C to detector 216. Detector 216 receives combined pulse P3 and outputs a signal to controller 248 that corresponds to the relative phases imparted to pulses P1 and P2 by PM's 266 and 206, respectively.

Once a desired number of pulses are exchanged, the key is derived using prior art techniques—for example, by Alice and Bob publicly comparing the basis of their measurements and only keeping the measurements (bits) corresponding to the same measurement basis. This forms the sifted key. They then choose a subset of the remaining bits to test for the presence of an eavesdropper Eve and then discard these bits. The act of eavesdropping on optical fiber 240 by Eve intercepting or otherwise attempting to measure the weak optical pulses being transmitted between Bob and Alice will necessarily introduce errors in the key due to the quantum nature of the photons being exchanged. If there are no errors in the sifted key due to the presence of an eavesdropper Eve, then the transmission is considered secure, and the quantum key is established.

Methods of Maintaining Optimal System Operation

FIG. 2 is a flow diagram 300 of the method of the present invention for maintaining optimal system operation of QKD system 200. The method involves performing both a detector gate scan and a detector gate dither in the manner described below.

In 302, the key exchange process is initiated by controller 248 instructing light source 202 to emit optical pulses 204 SO that time-multiplexed optical pulses P1 and P2 can be sent from Bob to Alice. This process includes controller 288 instructing PM 266 to phase modulate one of the pulses, having the pulses travel back to Bob, modulating the remaining pulse, combining the modulated pulses, and detecting the combined pulse P3, as described above.

Figure 3A:
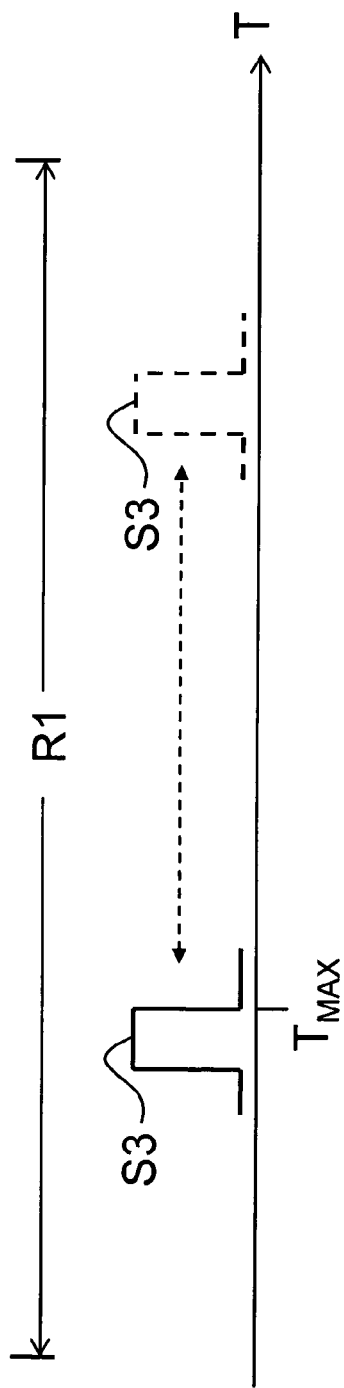
FIG. 3A is a timing diagram showing the variation of the arrival time T of the detector gate pulse to establish the optimum gate timing (i.e., optimal arrival time) $T_{MAX}$.
Figure 3B:
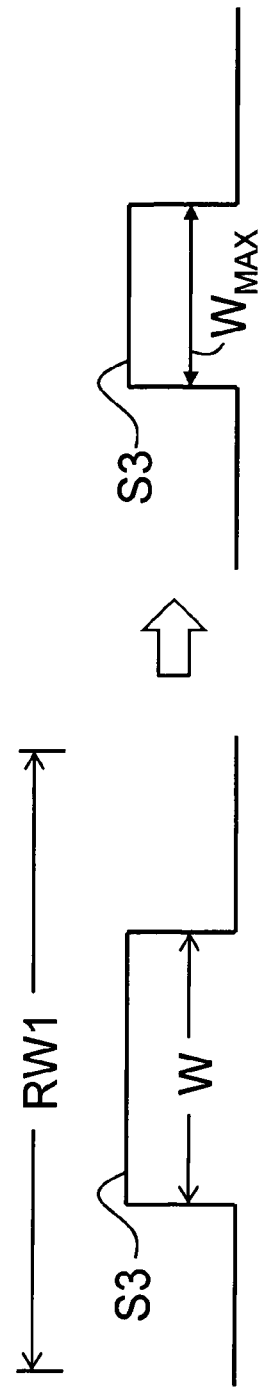
FIG. 3B is a timing diagram showing the variation in the detector gate pulse width W over a pulse width range RW1 to establish an optimum detector gate pulse width $W_{MAX}$.

In 304, a detector gate scan is performed. With reference to FIG. 3A, this involves varying the timing (e.g., the arrival time T) of detector gate pulse S3 over a selected range R1 of timing values to establish the optimal gate timing (arrival time) $T_{MAX}$ that yields the maximum number of photon counts $N_{MAX}$ detected by detector 216. With reference to FIG. 3B, in an example embodiment of the detector gate scan, the detector gate pulse width W is also optionally varied over a selected pulse width range RW1 to establish the optimum detector gate pulse width $W_{MAX}$.

Figure 4:
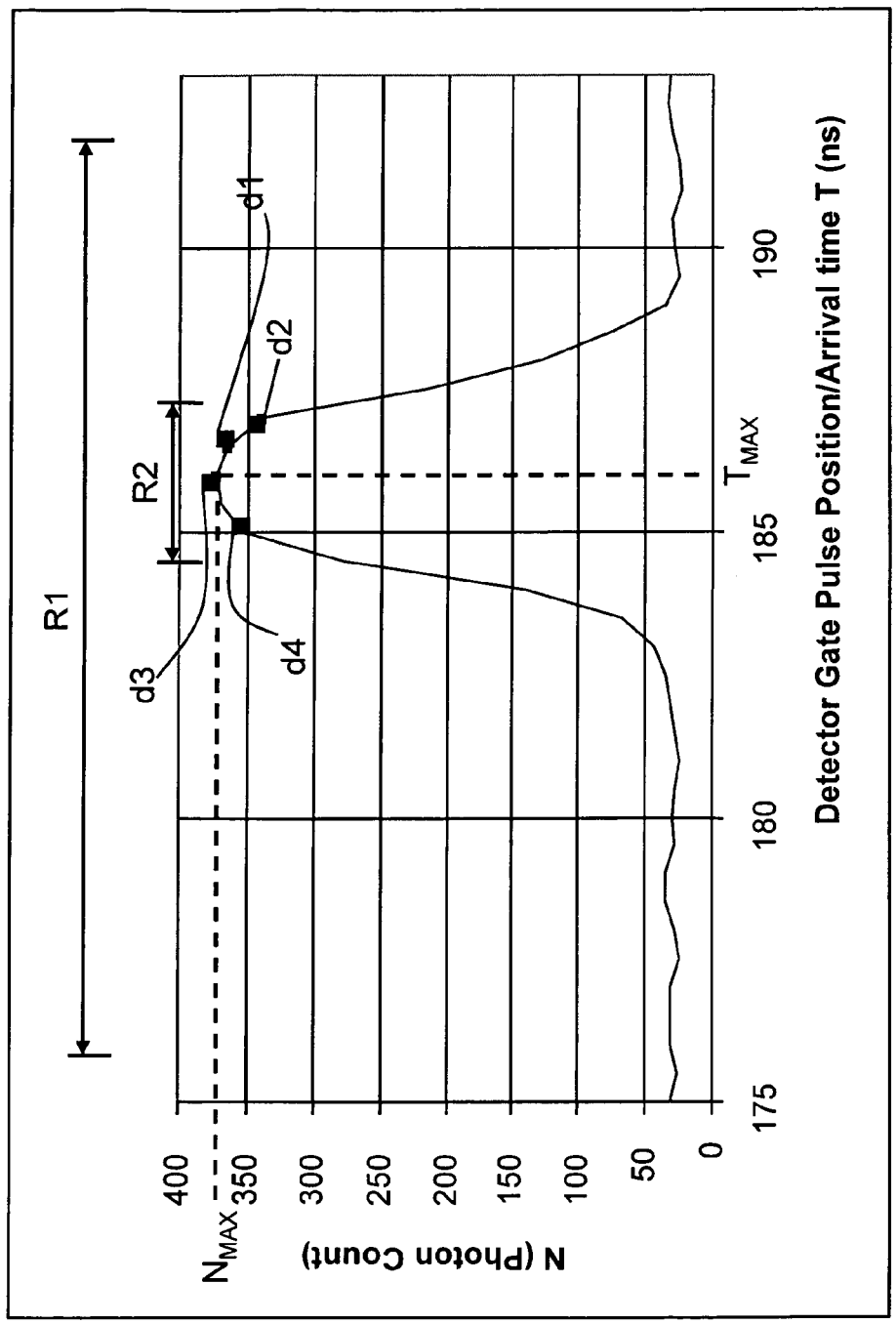
FIG. 4 is an example plot of a single-photon detector gate scan for a QKD system such as shown in FIG. 1, wherein the Y-axis is the number of photon counts N in a regular time interval, and the X-axis is the timing of the single-photon detector gate associated with the timing (position) of the detector gate pulse; and The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

FIG. 4 is an example plot of the results of a detector gate scan, wherein the Y-axis is the number N of photon counts obtained during the detector gate interval (i.e., the gate pulse width W). The X-axis represents the relative timing (e.g., arrival time T) of the single-photon detector gate pulse S3, which is varied to achieve maximum number of photon counts $N_{MAX}$. In the context of the present invention, the maximum number of photon counts $N_{MAX}$ corresponds to optimal system performance because it corresponds to the highest data transmission rates and highest photon sensitivity level vs. timing, with no increase in dark current counts. Likewise, in an example embodiment of the present invention, an optimal optical pulse is one that optimizes the ratio of photon pulses to dark event pulses, while maintaining a smooth single-photon detector response that allows for detector gate dithering, as described below.

The curve in FIG. 4 is obtained by incrementing the arrival time T of detector gate pulse S3 over a select range R1 of timing values T (X-axis). In an example embodiment, the arrival time T corresponds to the position of the leading edge of the detector gate pulse relative to a reference, e.g., a clock reference time provided by controller 248.

Once $T_{MAX}$ and $N_{MAX}$ are determined, then the process proceeds to 306, wherein the detector gate scan is terminated (i.e. is turned OFF).

In 308, detector gate dithering is performed. This involves repeatedly changing the timing (e.g., arrival time T) and/or pulse width W of the gate signal S3 by small amounts within a select timing range R2 around the maximum arrival time $T_{MAX}$ (i.e., the detector gate signal is "dithered"), and if necessary shifting the arrival time T from its original optimal value $T_{MAX}$ to a new optimal value $T'_{MAX}$ so that the photon count N is maintained at the maximum value $N_{MAX}$ (or alternatively, to a new maximum photon count $N'_{MAX}$). Note that select range R2 is less than R1 and is selected to surround a relatively small range about $T_{MAX}$. Also note that for optional pulse width dithering, the pulse width is dithered over a small range RW2 about the optimal pulse with $W_{MAX}$.

In an example embodiment, the timing range R2 is selected to be small enough to keep a security attacker (e.g., Eve) from leading the timing off to an undesirable location, yet large enough to allow for the dithering process to be successful, i.e., keep the photon count N at a maximum value $N_{MAX}$.

With reference again to FIG. 4, four data points d1, d2, d3 and d4 on the curve are highlighted for the sake of illustration. Assume the data point d1 is measured first, then the data point d2 associated with a larger arrival time value T is measured. Since the number of photon counts associated with d2 is less than that associated with d1, the arrival time T is decreased. The number of photon counts for the gate pulse position associated with data point d1 is re-measured. Since the number of photon counts N associated with the second data point at d1 is higher than that associated with data point d2, the arrival time T is further decreased and the photons count is measured. The result is data point d3, which has a higher photon count than for data point d1. The arrival time T is thus decreased again, yield the lower photon count associated with a data point d4. Since this measurement is less than that for d3, the arrival time T of detector gating pulse S3 is increased, but not so much that it returns to the value associated with data point d2.

In this manner, the gate pulse interval is varied back and forth ("dithered") until it converges on the maximum (or near-maximum) number of photon counts. Thus, during normal operation of single-photon detector 216, the detector gate dither process keeps the single-photon sensitivity high. In an example embodiment, detector gate dithering is performed periodically, for example every second. In an example embodiment, this rate is proportional to the number of single photon counts received.

In 310, the choice of performing an autocalibration of the detector gate signal S3 by initiating another detector gate scan is presented. If such autocalibration is desired or otherwise deemed necessary, then the method proceeds to 312. In 312, the detector gate dither is turned OFF and the process returns to the detector gate scan of 304 to perform an updated calibration of the detector gate timing and/or detector gate pulse width to find a new optimal arrival time $T_{MAX}$ and/or optimal pulse width $W_{MAX}$. This updated calibration may need to be performed for a variety of reasons, such as a detected change in the environment or because of normal system drifts.

In an example embodiment, autocalibration is performed when any of the following conditions occur: a) a change in photon count levels outside of statistical limits, b) ambient temperature changes greater than a predetermined amount such as 0.5° C. occur, c) an optical path has changed configuration, as through a switching network element, different from event a), as in a message of a pending event will be sent before the change in photon count levels, d) on a daily schedule due to known daily temperature cycling, and e) on a fixed time basis, such as every hour, whether needed or not.

The need to turn OFF the detector gate dither prior to performing the detector gate scan arises because the two processes can interfere with one another. Specifically, while the detector gate scan tries to increment the timing or width of the single photon detector gate pulse in a smooth (i.e., incremental) fashion, the detector gate dither tries to adjust the variable back and forth over small increments in order to stay on the maximum number of photon counts. Consequently, the two competing processes can product spurious results. Thus, following a scan and update of the detector gate pulse parameters during the detector gate scan of 304, the detector gate dither is automatically (or alternatively, is manually) turned back ON.

If there is no desire or need to perform the autocalibration, then the method remains in the detector gate dither process of 308, which as mentioned above is repeated, e.g., every second or so. The periodic detector gate dither process generally results in slight changes of the value of $T_{MAX}$ in order to maintain the photon count at $N_{MAX}$, or alternatively to maintain the photon count at new maximum values $N'_{MAX}$, $N''_{MAX}$, etc. For the sake of clarity and simplicity, in the present invention, "maximum photon counts" can mean $N_{MAX}$ or $N'_{MAX}$ or $N''_{MAX}$, etc. Likewise, the "optimal arrival time $T_{MAX}$" can change, and so in the present invention can mean $T_{MAX}$, $T'_{MAX}$ and $T''_{MAX}$, etc.

In an example embodiment, the above-described method of the present invention is embodied in at least one of computer readable medium 250 and 289 and is executed by at least one of controller 248 and 288 to carry out the method in QKD system 200.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of autocalibrating a single-photon detector arranged to detect weak photon pulses in a quantum key distribution (QKD) system, comprising:
   a) performing a detector gate scan by sending a detector gate pulse to the single-photon detector and varying an arrival time T of the detector gate pulse over a first select timing range R1 to determine an optimal arrival time $T_{MAX}$ that corresponds to a maximum number of photon counts $N_{MAX}$ from the single-photon detector by detecting the weak photon pulses; and
   b) performing detector gate dithering of the detector gate pulse by varying the arrival time T over a second select timing range R2 surrounding optimal arrival time $T_{MAX}$ to maintain the photon count at the maximum number of photon counts.

2. The method of claim 1, including:
   terminating the detector gate dithering and performing another detector gate scan.

3. The method of claim 1, further including performing the detector gate scan and detector gate dithering multiple times during operation of the QKD system.

4. The method of claim 1, wherein performing the detector gate scan includes varying a detector gate pulse width W over a first range of pulse widths RW1 to establish an optimal detector gate pulse width $W_{MAX}$.

5. The method of claim 4, wherein performing detector gate dithering includes varying the detector gate pulse width W over a second range of pulse widths RW2<RW1 to maintain an optimal pulse width.

6. A computer-readable medium having instructions embodied therein to direct a computer in a quantum key distribution (QKD) system to execute instructions to perform the following method of performing autocalibration of a single-photon detector arranged to detect weak photon pulses in the QKD system:
   a) sending a detector gate pulse to the single-photon detector and varying an arrival time T of the detector gate pulse over a first timing range R1 to determine an optimal arrival time $T_{MAX}$ that corresponds to a maximum number of photon counts $N_{MAX}$ from the single-photon detector; and
   b) dithering the detector gate pulse by varying the arrival time T over a second timing range R2 surrounding optimal arrival time $T_{MAX}$ to maintain the number of photon counts at either said maximum number of photon counts $N_{MAX}$ or a new maximum number of photon counts $N'_{MAX}$.

7. The computer-readable medium of claim 6, wherein the method further includes performing acts a) and b) multiple times during operation of the QKD system.

8. The computer-readable medium of claim 6, wherein the method further includes varying a detector gate pulse width W over a range of pulse widths to establish an optimal detector gate pulse width $W_{MAX}$ for the single-photon detector.

9. A method of operating a quantum key distribution (QKD) system having a single-photon detector operably coupled to a controller, comprising:
   sending weak photon pulses between encoding stations in the QKD system;
   performing a first detector gate scan by sending, from the controller to the single-photon detector, a detector gate pulse having an arrival time, including varying the arrival time over a first range of detector gate pulse arrival times to establish a first optimal arrival time $T_{MAX}$ corresponding to a first maximum number of photon counts $N_{MAX}$ determined by detecting said weak photon pulses by the single-photon detector;
   terminating the first detector gate scan when the first optimal arrival time $T_{MAX}$ is established; and
   performing a first detector gate dither by varying the arrival time over a second range of detector gate pulse arrival times about the first optimal arrival time $T_{MAX}$ to maintain either the first maximum number of photon counts $N_{MAX}$ or a second maximum number of photon counts $N'_{MAX}$, wherein the second range of detector gate pulse arrival times is within the first range of detector gate arrival times.

10. The method of claim 9, wherein performing the first detector gate dither results in a second optimal arrival time $T'_{MAX}$ different from the first optimal arrival time $T_{MAX}$.

11. The method of claim 9, further including:
   terminating the performing of the first detector gate dither;
   performing a second detector gate scan;
   terminating the second detector gate scan; and
   performing a second detector gate dither.

12. The method of claim 9, further including terminating and repeating the first detector gate dither periodically so as to perform a series of detector gate dithers.

13. The method of claim 9, further including varying a detector gate pulse width W over a range of pulse widths to establish an optimal detector gate pulse width $W_{MAX}$ for the single-photon detector.

14. A computer-readable medium having instructions embodied therein to direct a computer in a quantum key distribution (QKD) system to execute instructions to perform the following method of autocalibrating a single-photon detector arranged to detect photons in the QKD system:

sending weak photon pulses between encoding stations in the QKD system; performing a first detector gate scan by sending, from a controller to the detector, a detector gate pulse having an arrival time, including varying the arrival time over a first range of detector gate pulse arrival times to establish a first optimal arrival time $T_{MAX}$ corresponding to a first maximum number of photon counts $N_{MAX}$ determined by detecting said weak photon pulses by the single-photon detector;

terminating the first detector gate scan when the first optimal photon count $N_{MAX}$ is established; and performing a first detector gate dither by varying the arrival time over a second range of detector gate pulse arrival times about the first optimal arrival time $T_{MAX}$ to maintain either the first maximum number of photon counts $N_{MAX}$ or a second maximum number of photon counts $N'_{MAX}$, wherein the second range of detector gate pulse arrival times is within the first range of detector gate arrival times.

15. A method of autocalibrating a single-photon detector in a quantum key distribution (QKD) system having a controller, comprising:

sending weak photon pulses between encoding stations in the QKD system;

performing a first detector gate scan to determine an optimum arrival time of a detector gate pulse sent from a controller to the single-photon detector;

terminating the first detector gate scan; and periodically performing a first detector gate dither to maintain a maximum number of photon counts from the single-photon detector.

16. the method of claim 15, further including:

terminating the first detector gate dither; and performing a second detector gate scan.

17. The method of claim 15, further including varying a detector gate pulse width W over a range of pulse widths to establish an optimal detector gate pulse width $W_{MAX}$ for the single-photon detector.

18. A method of performing photon detector autocalibration in quantum key distribution (QKD) system having a single-photon detector coupled to a controller adapted to generate a detector gate pulse having a corresponding arrival time at the single-photon detector, the method comprising:

performing a detector gate scan to establish an optimum arrival time of the detector gate pulse that corresponds with a first maximum number of photon counts of weak photon pulses detected by the single-photon detector;

terminating the detector gate scan; and performing a detector gate dither process by varying the detector gate pulse arrival time around the optimal arrival time to adjust the arrival time to ensure that the single-photon detector produces either the maximum number of photon counts or a second maximum number of photon counts when detecting the weak photon pulses.

19. The method of claim 18, further including varying a detector gate pulse width W over a range of pulse widths to establish an optimal detector gate pulse width $W_{MAX}$ for the single-photon detector.

* * * * *